Patented July 31, 1945

2,380,406

UNITED STATES PATENT OFFICE 2,380,406

PRODUCTION OF LOW SULPHUR SPONGE IRON

Russell C. Buehl, Wilkinsburg, Pa., assignor to the Government of the United States, as represented by the Secretary of the Interior No Drawing. Application October 27, 1943, Serial No. 507,897

13 Claims. (Cl. 75—33)

(Granted under the act of March 3, 1883, as amended April 30, 1928; 370 O. G. 757)

The invention described herein may be manufactured and used by or for the Government of the United States for governmental purposes without the payment to me of any royalty thereon in accordance with the provisions of the act of April 30, 1928 (Ch. 460, 45 Stat. L. 467).

This invention relates to the production of easily reducible metals from their ores, and more particularly to the production of such metals of a low sulphur content. Still more particularly, this invention relates to the production of metallic iron and similar metals of the iron group of the periodic system wherein the final product has a low sulphur content.

It is an object of this invention to provide a process for producing metals of low sulphur content from ores thereof capable of reduction by carbonaceous reducing agents. Another object is to produce metallic iron of low sulphur content by heating ores thereof in the presence of a reducing and desulphurizing agent. Still another object is to provide an effective reducing and desulphurizing agent for the reduction of metals which are easily reducible. Other objects and advantages will be apparent or will appear hereinafter.

These objects are accomplished in accordance with this invention wherein an ore of an easily reducible metal is heated at an elevated temperature in the presence of a carbonaceous reducing agent with an alkaline earth compound having a difficultly reducible alkaline earth metal combined with at least one of the elements from the group of carbon, hydrogen and oxygen. It has been found that the simultaneous desulphurization and reduction of metallic ores can be carried out in a very efficient manner with a composition prepared by pre-calcining a carbonaceous reducing agent with certain alkaline earth compounds hereinafter more fully described.

Suitable ores for reduction in accordance with this invention includes ores of metals which are capable of reduction with coke or other carbonaceous reducing agents at an elevated temperature. Examples of such ores are the oxides, carbonates and the like of iron, copper, cobalt, nickel, cadmium and other metals which can be reduced with carbonaceous reducing agents. In general, ores of metals of the iron group of the periodic system can best be treated in accordance with this invention, and of these, iron ore itself constitutes a preferred member.

Suitable carbonaceous reducing agents for employment in accordance with this invention include charcoal, coals, petroleum coke, bitumen, and preferably bituminous coals having coking characteristics. Organic compounds of carbon which carbonize during the pre-calcining treatment or the reduction treatment later to be described, can also be employed.

Suitable alkaline earth compounds for employment in accordance with the present invention include alkaline earth compounds having a difficultly reducible alkaline earth metal combined with at least one of the elements from the group of carbon, hydrogen and oxygen. By the expression "difficultly reducible alkaline earth metal" is meant alkaline earth metals whose oxides are not reduced when heated together with coke, carbon monoxide and the like. Examples of suitable alkaline earth metal compounds are the carbides, hydrides, oxides, hydroxides, carbonates and bicarbonates of strontium, magnesium, barium and preferably calcium, such as dolomite, calcium carbide, magnesia, quicklime, and preferably ordinary limestone.

In operation, the coking coal or other carbonaceous reducing agent is preferably comminuted to pass through a standard Tyler screen of 10 mesh and the limestone or other suitable alkaline earth compound is likewise comminuted to a similar or finer size. Thereafter the reducing agent and the alkaline earth compound are thoroughly mixed with each other and heated to an elevated temperature in the absence of oxygen, preferably to a temperature of the order of about 1200 degrees Fahrenheit, until the mixture is at least partly coked in the case of bituminous coal, preferably for at least about thirty minutes. The calcined material then is cooled, comminuted if necessary to its former size, and thoroughly admixed with finely-divided iron ore or other metal ore to be reduced. Thereafter, the metal is smelted from the mixture by any convenient means such as by heating to reducing temperatures in a blast furnace or the like. One simple way to carry out the final reduction is to charge the mixture of an ore to be reduced and pre-calcined alkaline earth compound-carbonaceous reducing agent into a slightly inclined, brick-lined, rotary kiln heated internally by a gas or oil burner situated adjacent the discharge end. The feed mixture is charged into the elevated end of the rotary kiln and in passing through the kiln is heated to a temperature of 1800 to 2000 degrees Fahrenheit or higher. The reduced mixture is continually discharged near the lower end of the rotary kiln into a quenching device and is, in the case of iron, in a spongelike or granular form. The resulting iron or other reduced metal is of extremely low sulphur content and is admirably suited for the manufacture of structural shapes and the like or for further metallurgical operations requiring a low-sulphur feed metal.

The following illustrative examples show how the invention may be carried out, but it is not limited thereto. Parts are by weight unless otherwise designated.

*Example 1*

A crystalline magnetite from the northeastern part of New York State known as "Chateaugay" ore, was comminuted to pass a 20 mesh standard Tyler screen. A coking bituminous coal mined at Bruceton, Pennsylvania, was similarly comminuted and admixed with the proportion of hydrated lime or limestone indicated in the table below. The mixture was then heated in a covered plumbago crucible for two hours at a temperature of 1700 degrees Fahrenheit. The crucible and contents were then cooled, the contents comminuted to minus 20 mesh and mixed with three times its weight of the previously comminuted Chateaugay ore. The mixture of ore and calcined lime-coke mixture was then placed in a plumbago crucible covered, and heated in a gas-fired furnace for four hours at 1900 degrees Fahrenheit. After the final heating, during which reduction of the iron takes place, the liberated metal was separated from residual materials such as unreacted coke, ash, lime and the like by magnetic separation. The sponge iron produced was analyzed for sulphur by the evolution method; metallic iron by the mercuric chloride method; and total iron by the Zimmerman-Reinhardt method. The reduction was calculated as the ratio of the metallic to the total iron content of the sample. The results of these analyses are tabulated below.

TABLE

| Sample No. | Reducing agent [1] | Product analyses, per cent by weight | |
|---|---|---|---|
| | | Evolution sulphur | Per cent reduction |
| 1 | Bruceton, Pennsylvania coal coked with ¼ its weight of lime. | 0.06 | 95.1 |
| 2 | Bruceton coal mixed with ¼ its weight of lime but not coked. | 0.28 | 91.0 |
| 3 | Bruceton coal, coked only, no lime. | 0.38 | 97.7 |
| 4 | Bruceton coal, coked, mixed with ¼ its weight of lime after coking. | 0.28 | 96.1 |
| 5 | Bruceton coal coked with 0.3 its weight of limestone (rock-dust). | 0.04 | 97.3 |

[1] Bruceton coal contains 1.6 per cent sulphur.

A similar test was carried out employing petroleum coke, cold-mixed with lime, but the sponge iron produced averaged 0.18 percent by weight sulphur.

As shown in the foregoing description and example, iron of a very low sulphur content can be produced by heating iron ores with a pre-calcined mixture of a suitable alkaline earth compound and a suitable carbonaceous reducing agent. The pre-calcining step gives a much lower sulphur content to the finished metallic iron than any other method of reduction. It has been found that employing the same carbonaceous reducing agent and, for example, limestone in simple admixture with the iron ore, a much higher sulphur content in the finished iron results.

While the invention has been particularly described in connection with iron production by the sponge method, its utility is not limited thereto, since the reducing and desulphurizing agent prepared in accordance with this invention can be employed as well in a blast furnace to produce iron of a very low sulphur content. Desirably, a fraction of the limestone and coke requirement of a blast furnace can be pre-calcined in accordance with this invention to yield substantial benefits in ordinary blast furnace operation.

While the invention has been particularly described in relation to the reduction of iron ore, it is likewise useful in the reduction of other metallic ores by means of coke, where it is desired to have a low sulphur content in the finished metal.

Since many apparently widely differing embodiments of the invention will occur to one skilled in the art, the invention is not limited to the specific details illustrated and described, and various changes can be made therein without departing from the spirit and scope thereof.

What is claimed is:

1. In a process for producing metallic iron by reducing an ore thereof with a carbonaceous reducing agent at an elevated temperature, the step which comprises carrying out the reduction at a temperature between 1700 degrees Fahrenheit and 2100 degrees Fahrenheit in the presence of a pre-calcined mixture of a coking bituminous coal with a calcium compound selected from the group consisting of the oxides, hydroxides, carbides, hydrides, carbonates and bicarbonates of calcium.

2. A metallurgical composition for the production of a relatively sulphur-free metal which comprises a reducible ore having incorporated therewith a calcined mixture of a carbonaceous reducing agent with an alkaline earth compound selected from the group consisting of the oxides, hydroxides, carbides, hydrides, carbonates and bicarbonates of the alkaline earth metals.

3. A metallurgical composition for the production of a relatively sulphur-free metal which comprises an iron ore having incorporated therewith a calcined, intimate mixture of a coking coal with limestone.

4. A process for producing a metal of the iron group of the periodic system by reducing an ore thereof, which comprises admixing a coking coal with a calcium compound of the group consisting of the oxides, carbides, hydrides, carbonates, and bicarbonates of calcium, calcining the resulting mixture at an elevated temperature of approximately 1200 degrees Fahrenheit, then admixing an ore of a metal of the iron group therewith, and heating the resulting mixture at a temperature of 1700 degrees Fahrenheit to 2100 degrees Fahrenheit to produce a metal of the iron group having a low sulphur content.

5. A process for reducing iron ores which comprises intimately admixing a coking bituminous coal with limestone, calcining the resulting mixture at an elevated temperature at which the coal is at least partially converted into coke, then admixing iron ore with said calcined mixture, and heating the final mixture to a temperature between 1700 and 2100 degrees Fahrenheit, to produce metallic iron.

6. The process for reducing iron ores which comprises intimately admixing about 5 parts by weight of bituminous coal with about 1 part by weight of limestone, grinding the mixture to a maximum size of 10 mesh (standard Tyler screen), calcining the resulting mixture at a temperature of approximately 1200 degrees Fahrenheit, then admixing about six parts by weight iron ore with said calcined mixture and regrinding the resulting mixture to pass a standard 10 mesh Tyler screen, and finally heating and agitating the material at a temperature of 1700 to 2100 degrees Fahrenheit, to produce metallic iron low in sulphur content.

7. In a process for producing a metal by reducing an ore thereof with a carbonaceous reducing agent at an elevated temperature, the step which comprises carrying out the reduction without fusion of the produced metal in the presence of a pre-calcined mixture of a carbonaceous reducing agent with an alkaline earth compound selected from the group consisting of the oxides, hydroxides, carbides, hydrides, carbonates and bicarbonates of the alkaline earth metals.

8. In a process for producing a metal by reducing an ore thereof with a carbonaceous reducing agent at an elevated temperature, the step which comprises carrying out the reduction without fusion of the produced metal in the presence of a pre-calcined mixture of bituminous coal with an alkaline earth compound selected from the group consisting of the oxides, hydroxides, carbides, hydrides, carbonates and bicarbonates of the alkaline earth metals.

9. In a process for producing a metal from the iron group of the periodic system by reducing an ore thereof with a carbonaceous reducing agent at an elevated temperature, the step which comprises carrying out the reduction without fusion of the produced metal in the presence of a pre-calcined mixture of a carbonaceous reducing agent with a calcium compound selected from the group consisting of the oxides, hydroxides, carbides, hydrides, carbonates and bicarbonates of calcium.

10. In a process for producing metallic iron by reducing an oxide ore thereof with a carbonaceous reducing agent at an elevated temperature, the step which comprises carrying out the reduction without fusion of the produced metal in the presence of a pre-calcined mixture of a carbonaceous reducing agent with an alkaline earth compound selected from the group consisting of the oxides, hydroxides, carbides, hydrides, carbonates and bicarbonates of the alkaline earth metals.

11. In a process for producing metallic iron by reducing an ore thereof with a carbonaceous reducing agent at an elevated temperature, the step which comprises carrying out the reduction without fusion of the produced metal in the presence of a pre-calcined mixture of bituminous coal with a calcium compound selected from the group consisting of the oxides, hydroxides, carbides, hydrides, carbonates and bicarbonates of calcium.

12. A process for producing a metal by reducing an ore thereof with a carbonaceous reducing agent at an elevated temperature which comprises intimately admixing a solid carbonaceous reducing agent with an alkaline earth compound selected from the group consisting of the oxides, hydroxides, carbides, hydrides, carbonates and bicarbonates of the alkaline earth metals, calcining the resulting mixture at an elevated temperature, then admixing an ore of a reducible metal therewith, and heating the resulting mixture at reducing temperatures without fusion of the produced metal and recovering a reduced metallic product.

13. In the reduction of iron ores without fusion of the produced metal, the employment of a pre-calcined intimate mixture of limestone and coking coal as a reducing agent.

RUSSELL C. BUEHL.